R. MILLER.
TAKE-UP BUCKLE.
APPLICATION FILED AUG. 25, 1910.
1,033,338.  Patented July 23, 1912.
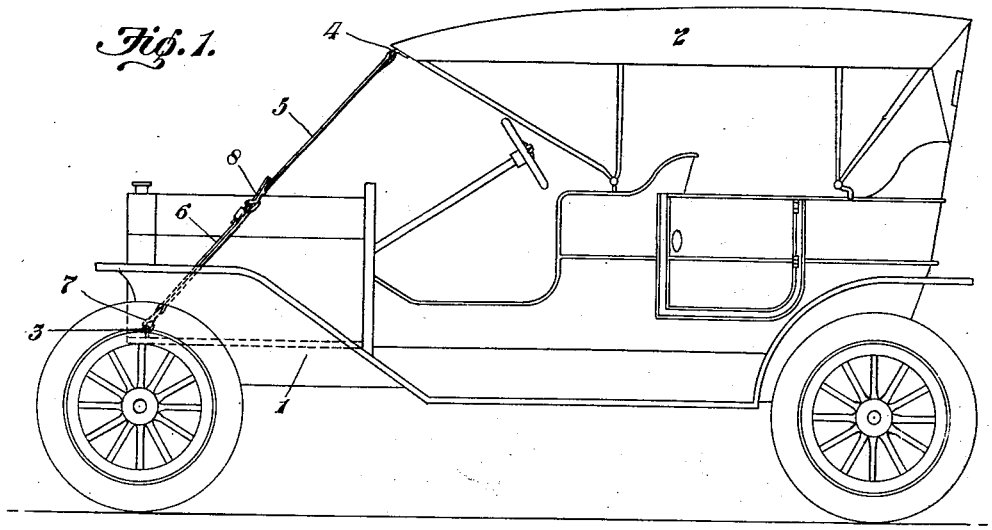
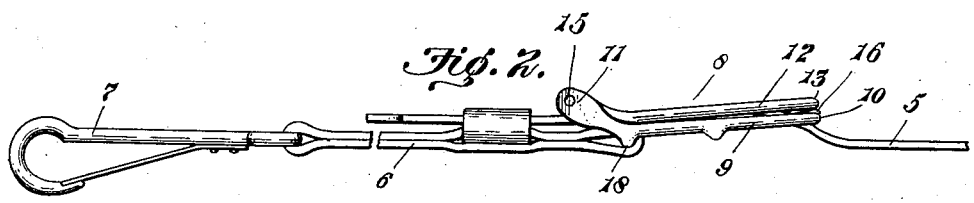
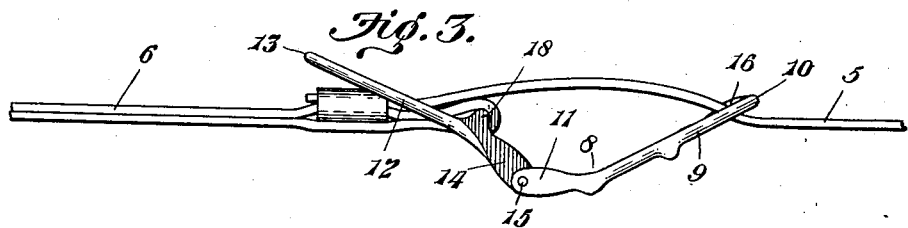
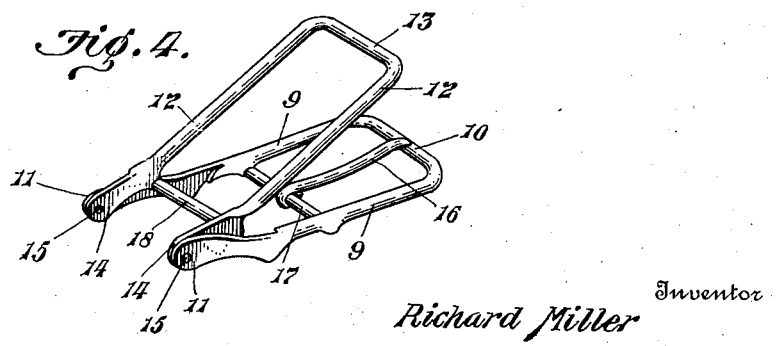
Witnesses
J. H. Bishop.
Irene Lutz.
Inventor
Richard Miller
By
Bond + Miller
Attorneys

UNITED STATES PATENT OFFICE.

RICHARD MILLER, OF NEW BERLIN, OHIO.

TAKE-UP BUCKLE.

1,033,338.

Specification of Letters Patent.

Patented July 23, 1912.

Application filed August 25, 1910. Serial No. 578,904.

*To all whom it may concern:*

Be it known that I, RICHARD MILLER, a citizen of the United States, residing at New Berlin, in the county of Stark and State of Ohio, have invented a new and useful Take-Up Buckle, of which the following is a specification.

My invention relates to improvements in devices for holding the tops of automobiles in place and bracing the same, and has special reference to a take-up buckle.

Top straps on automobiles usually consist of straps attached to the front of the top and extending forwardly and downwardly and connected at their other ends to the frame of the machine at the sides of the hood. It is frequently desirable to connect or disconnect the forward lower ends of said top straps when opening the hood of the automobile to care for the engine or other parts therein, or when folding or unfolding the top. At the same time it is necessary that said top straps, when in use, be very taut, so as to thoroughly brace and hold the top in position to prevent any straining of the parts thereof when running the automobile over rough roads or at a high rate of speed.

By my invented device it is possible to fasten the lower forward end of an automobile strap while said strap is in comparatively slack condition and then take up or shorten the strap by means of the take-up buckle, so as to draw said strap into the desired taut condition.

The objects of the invention are to generally improve devices of the character mentioned and to provide a take-up buckle for automobile top straps of simple and inexpensive construction, neat in appearance and thoroughly efficient. These objects, together with other objects readily apparent to those skilled in the art, I attain by the construction illustrated in the accompanying drawings, although my invention may be embodied in other forms, the construction illustrated being chosen by way of example.

In the drawings Figure 1 is a side view of an automobile provided with a top in raised position and a top strap provided with a take-up buckle of my invented construction. Fig. 2 is a side view on a larger scale of a top strap such as shown in Fig. 1 together with a take-up buckle, portions of said strap being broken away. Fig. 3 is a side view of portions of the strap and the take-up buckle, said buckle being in the extended position. Fig. 4 is a perspective view of the take-up buckle only, the buckle in said figure being partly closed.

Throughout the several views similar reference numerals indicate similar parts.

The numeral 1 indicates the frame of an automobile, said automobile being provided with the top 2. To the frame 1 is connected a loop or eye 3 and to the top 2 is connected another loop 4. The upper portion 5 of the top strap is connected to the loop 4 in any well known manner, while the lower portion 6 of said top strap is detachably connected to the eye 3 by means of the snap fastener 7 or its equivalent. Intermediate the upper portion 5 and the lower portion 6 of the top strap is the take-up buckle 8.

The take-up buckle illustrated in the drawings comprises a buckle yoke and a take-up yoke. The buckle yoke is preferably U-shaped and has the spaced arms 9 connected at one end by the integral cross-bar 10, the arms 9 terminating at their other ends in the free end portions 11. The take-up yoke is also preferably U-shaped and of a size substantially the same as the buckle yoke, being provided with the spaced arms 12 connected by the cross-bar 13, said arms 12 being adapted to over-lie the arms 9, and the cross-bar 13 adapted to over-lie the cross-bar 10, the arms 12 terminating at their other ends in the free end portions 14. The arms and cross-pieces of each yoke are adapted to lie substantially in a single plane, the free end portions of each yoke, however, being bent or extended outwardly from said plane, the free ends of the buckle yoke being extended outwardly in greater degree than the ends of the take-up yoke. The inner sides of the free ends of the buckle yoke are recessed and the outer sides of the free ends of the take-up yoke are recessed, as shown in the drawings. Said ends being so recessed permits the ends of the take-up yoke to be arranged within and between the ends of the buckle yoke, and means, such as rivets, are arranged at the points 15 to pivotally connect the yokes. The axis of such pivotal connection is parallel with but considerably to the side of the planes of the said yokes. Where the inward recesses on the ends of the arms of the take-up yoke terminate and said arms become of full width shoulders are formed, as shown in the drawings, said shoulders being adapted to engage the arms of the buckle yoke when the yokes are in the closed position illustrated in Fig. 2. To compensate for the lateral narrowing of the ends of the arms by reason of the recessed structure, said ends are broadened in planes perpendicular to the general planes of the yokes. This broadening also strengthens the ends of the arms at the places where the greatest strain is borne.

From an inspection of the figures it will be seen that when the take-up yoke is brought over into the closed position illustrated in Fig. 2 so that the arms 12 over-lie the arms 9 the said take-up yoke will be firmly supported in its said position when under the strains and stresses to which it will be subjected in use, for the reason that the full width arms 12 over-lie the arms 9 immediately adjacent the ends of the recesses, so that there will be no tendency of the take-up yoke to "pull through" the buckle yoke when the device is in the closed position.

On the buckle yoke is a buckle tongue 16 pivotally mounted upon the cross-bar 17 connected to the arms 9. The end of the tongue 16 is adapted to rest against the cross-bar 10, on the top side thereof and by arranging longitudinally spaced apertures in the strap 5 the buckle yoke may be connected to the strap 5 at the point desired in the usual well known manner. On the arms 12 substantially where the end portions 15 turn outwardly from the plane of said arms the strap connecting bar 18 is connected to the arms 12, integral portions of said arms being slightly off-set from the plane of the yoke to the opposite side of said plane from the end portions 14, thus bringing the bar 18 to one side of said plane and the pivotal connections at 15 on the other side of said plane, while the bar 18 is also longitudinally spaced upon the arms 12 from the pivotal connections at 15 a portion of the distance from said pivotal connections to the cross-bar 13. To the cross-bar 18 the strap 6 is connected by means of a loop of said strap extending around said bar in the usual and well known manner illustrated in the drawings.

In use the buckle yoke and take-up yoke may be pivotally moved with reference to each other, thus throwing the cross-bar 18 circularly about the pivotal points 15 so as to place said bar 18 either intermediate the pivotal points 15 and the cross-bar 10 as illustrated in the contracted position as shown in Fig. 2 or beyond the pivotal point 15 in the extended position illustrated in Fig. 3, when the pivotal points 15 lie intermediate the cross-bar 10 and the cross-bar 18. The strap 5 should be connected to the buckle yoke at the cross-bar 10 by means of the tongue 16 or its equivalent in such adjustment as to permit the snap fastener 7 to be connected to the eye 3 when the take-up device is in the extended position, the adjustment of the strap 5 with reference to the cross-bar 10 being such as to make it necessary to draw the strap up comparatively tightly when so engaging said fastener with said eye. To take up or draw the strap taut it is then only necessary to move the take-up yoke pivotally with reference to the buckle yoke until the two yokes are brought into the contracted position illustrated in Fig. 2, when said take-up yoke will over-lie the buckle yoke, the cross-bar 13 over-lying the end of the tongue 16 and holding the same down against the bar 10. During this pivotal movement the cross-bar 18, being moved from a position beyond the pivotal points 15 to a point equally beyond said points intermediate said points and the cross-bar 10, a drawing or taking up effect as between the straps 5 and 6 will be produced, thus drawing said straps into a very taut condition.

The cross-bar 18 lying to one side of the general plane of the yokes, and the pivotal points 15 lying to the other side of said plane, the draft of the straps upon the buckle yoke and take-up yoke will tend to maintain said yokes in the closed or taken up position illustrated in Figs. 1 and 2 until such time as it is desired to loosen the straps, when the take-up yoke can be lifted from the buckle yoke and pivotally moved back again into the extended position.

The many advantages of my invented construction in the case of automobile top straps will be quite apparent and the usefulness and practical value of the device will be evident to those skilled in the art.

It should be noted that while the take-up device is shown and described as applied to an automobile top strap, the same device may be of practically equal value in other instances where it may be desired to draw or take up straps or other bands or fastening devices.

I claim:

A take-up buckle for automobile top straps comprising a buckle yoke and a take-up yoke each comprising spaced arms connected at one end by an integral cross-bar, the greater portion of each yoke lying in a single plane, the arms of each yoke at their free ends turned to one side of the plane of the yoke, the arms of the buckle yoke being turned outwardly in greater degree than the arms of the take-up yoke, the inner sides of the ends of the arms of the buckle yoke recessed, the outer sides of the ends of the arms of the take-up yoke recessed, the ends of the take-up yoke arranged within and between the ends of the buckle yoke, said buckle yoke provided with a buckle tongue having its free end resting upon the upper side of the said integral cross-bar of said yoke, said take-up yoke provided with a strap connecting bar extending from arm to arm thereof and lying to the side of the plane of said yoke opposite the side to which the arms are outwardly turned, means pivotally connecting the outwardly turned ends of the arms, the axis of pivotal connection lying in a plane parallel with and to the side of the planes of said yokes, the greater portion of the arms, and the integral cross-bar of said take-up yoke adapted to over-lie the corresponding parts of the buckle yoke, and said cross-bar of said take-up yoke adapted to bear against the free end of said buckle tongue, when the device is in the closed position.

In testimony that I claim the above, I have hereunto subscribed my name in the presence of two witnesses.

RICHARD MILLER.

Witnesses:
 JOHN H. SPONSELLER,
 WILLIAM H. MILLER.

Copies of this patent may be obtained for five cents each, by addressing the "Commissioner of Patents, Washington, D. C."